US011316582B1

(12) United States Patent
Rashid et al.

(10) Patent No.: US 11,316,582 B1
(45) Date of Patent: Apr. 26, 2022

(54) PROSPECTIVE UPLINK GRANT FOR SATELLITE COMMUNICATIONS

(71) Applicant: AMAZON TECHNOLOGIES, INC., Seattle, WA (US)

(72) Inventors: Mohammad Mamunur Rashid, Redmond, WA (US); Baosheng Li, Kirkland, WA (US); Deepak, Sammamish, WA (US); Ali Masoomzadeh, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 95 days.

(21) Appl. No.: 16/928,317

(22) Filed: Jul. 14, 2020

(51) Int. Cl.
*H04B 7/185* (2006.01)
(52) U.S. Cl.
CPC ..... *H04B 7/18517* (2013.01); *H04B 7/18521* (2013.01); *H04B 7/18528* (2013.01); *H04B 7/18539* (2013.01)
(58) Field of Classification Search
None
See application file for complete search history.

(56) References Cited

U.S. PATENT DOCUMENTS

| | | | | |
|---|---|---|---|---|
| 9,936,519 | B2* | 4/2018 | Mukkavilli | H04L 1/1671 |
| 10,342,038 | B2* | 7/2019 | Sun | H04W 72/042 |
| 10,477,520 | B2* | 11/2019 | Liu | H04W 72/14 |
| 10,547,375 | B1* | 1/2020 | Iyer | G01R 29/26 |
| 10,798,603 | B2* | 10/2020 | Chapman | H04W 72/14 |
| 10,944,471 | B2* | 3/2021 | Ravishankar | H04B 7/18571 |
| 11,063,658 | B2* | 7/2021 | Hawthorne | H04W 72/0446 |

OTHER PUBLICATIONS

Deering, S. et al., "Internet Protocol, Version 6 (IPv6) Specification", RFC 8200, DOI 10.17487/RFC8200, Jul. 2017, 44 pages. https://www.rfc-editor.org/rc/pdfrfc/rfc8200.txt.pdf.
Kent, S., "IP Authentication Header", RFC 4302, DOI 10.17487/RFC4302, Dec. 2005, 36 pages. https://www.rfc-editor.org/rfc/pdfrfc/rfc4302.txt.pdf.
Moskowitz, R. et al., "Host Identity Protocol Version 2 (HIPv2)", RFC 7401, DOI 10.17487/RFC7401, Apr. 2015, 130 pages. https://www.rfc-editor.org/rfc/pdfrfc/rfc7401.txt.pdf.

(Continued)

*Primary Examiner* — Tri H Phan
(74) *Attorney, Agent, or Firm* — Lindauer Law, PLLC

(57) ABSTRACT

Satellites provide communication between devices such as user terminals (UTs) and ground stations that are in turn connected to other networks, such as the Internet. Latency for signals to and from the satellite can introduce delays due at least in part to propagation time. The latency adversely interacts with data transfers that result in responses from the UT. Downstream data to the UT is processed to determine if a response is expected. Header data is associated with the downstream data that is sent to the satellite. A resource scheduler onboard the satellite uses the header data to provide a prospective grant to the UT to send the expected response. The UT receives the downstream data, response data such as an acknowledgement is generated, and the response data is sent to the satellite using the prospective grant. The system substantially reduces the latency associated with responsive traffic and improves overall throughput.

20 Claims, 5 Drawing Sheets

(56) References Cited

OTHER PUBLICATIONS

"5G/NR—Scheduling", ShareTechnote, 5 pgs. Retrieved from the Internet: URL: http://www.sharetechnote.com/html/5G/5G_Scheduling.html.

"MAC Structure Overview", ShareTechnote, 17 pgs. Retrieved from the Internet: URL: http://www.sharetechnote.com/html/MAC_LTE.html#MAC_Structure_Overview.

Brown, et al., "Predictive Resource Allocation in the LIE Uplink for Event Based M2M Applications", The University of Newcastle Callaghan, School of Electrical Engineering and Computer Science, 6 pgs. Retrieved from the Internet: URL: https://eprints.usq.edu.au/35200/1/Brown_Khan_AV.pdf.

Emmelmann, Marc, "TCP/IP Over Satellite", Jul. 24, 2000, 9 pgs. Retrieved from the Internet: URL: http://www.emmelmann.org/Library/Papers_Reports/docs/Tcplp_overSatellite/Tcplp_overSatellite.pdf.

Li, et al., "Predictive Pre-allocation for Low-latency Uplink Access in Industrial Wireless Networks", Shanghai Jiao Tong University, Department of Electronics, and Key Laboratory of System Control and Information Processing, Ministry of Education of China, Jan. 6, 2018, 9 pgs. Retrieved from the Internet: URL: https://arxiv.org/pdf/1801.06451.pdf.

\* cited by examiner

PROSPECTIVE UPLINK GRANT FOR SATELLITE COMMUNICATIONS

BACKGROUND

Satellites in non-geosynchronous orbits (NGO) move relative to a body they are orbiting, such as the Earth. A device that is using these satellites for communication services will experience latency that includes propagation time for a signal to travel between the satellite and the device. Operational considerations including the latency combined with patterns of sending data and any resulting responses may adversely impact network throughput.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
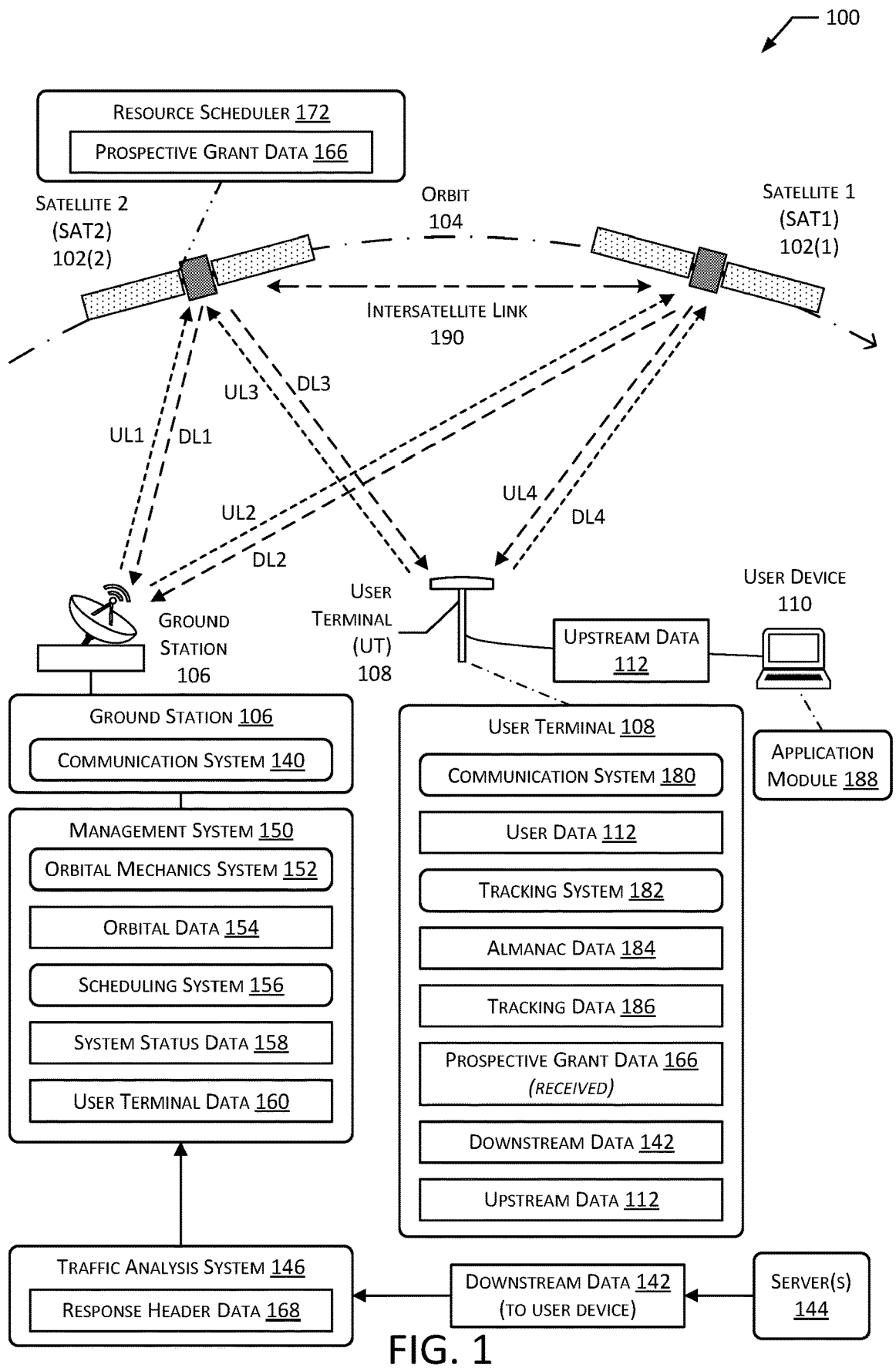
FIG. 1 illustrates a system that provides prospective grants for a user terminal to send data to a satellite, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

Non-geosynchronous orbit (NGO) satellites move relative to a body such as the Earth, Moon, Mars, and so forth. These NGOs may be part of a network to provide communication services between devices, such as user terminals (UT) located on or near the body. For example, a first UT on a first geographic location (geolocation) on the Earth may send upstream data to a first satellite that is in range of the first UT. The first satellite may send the upstream data to a ground station that is part of a ground station, another satellite, and so forth. Likewise, downstream data destined for the first UT may be sent by the ground station to the first satellite, which then sends the downstream data to the first UT. For ease of illustration, and not necessarily as a limitation, a satellite may be deemed "in range" of a UT when communication may take place. For example, a satellite may be in range when it is within line of sight of the UT, a distance between the satellite and the UT is less than a threshold distance, the UT is within a footprint of an antenna onboard the satellite, and so forth.

A period, or duration, of an orbit varies depending upon the altitude of the satellite with respect to the body, eccentricity of the orbit, and so forth. For example, a satellite at an altitude of 600 kilometers (km) will take approximately 96 minutes to complete a circular orbit around the Earth. Depending on a variety of factors including the curvature of the Earth, a satellite may be in range of a particular UT for only a few minutes. In comparison, a geosynchronous satellite has an orbital period that coincides with the rotation of the earth, so a geosynchronous satellite appears to remain motionless with respect to the earth.

Signals between the UT and the satellite are limited to travelling at the speed of light. The farther away a satellite is from the UT, the longer it takes for a signal to travel to the satellite and then travel back to Earth. For example, a hop (sending a signal to the satellite and back down to the ground, or vice versa) to a geosynchronous satellite introduces a delay of at least 240 milliseconds (ms). Additional delays due to signal processing, buffering, and so forth may also be present. Such delays, or latency, are undesirable for many types of communication. For example, a real-time voice call in which there is a ¼ second delay can be aggravating. Likewise, time-sensitive communication activities such as remote control of devices, industrial reporting and control, gaming, and so forth may be adversely affected by these latencies. In comparison, a hop involving an NGO satellite at an altitude of 600 km only introduces about 4 ms of latency. As a result, compared to using geosynchronous satellites, the use of NGO satellites significantly reduces latencies due to signal travel times.

Using a constellation of many NGO satellites offers significant benefits. Latency is dramatically reduced, improving usefulness for communication. Shorter distances between the UT and the satellite allows for increased UT density by allowing greater frequency re-use and sharing. Power and antenna gain requirements for both the UT and the satellites are also reduced due to the shorter distances, compared to communication using geosynchronous satellites. This allows for relatively smaller and less expensive satellites to be used.

However, while the latencies introduced by use of NGO satellites are less than those of geosynchronous satellites, they still may adversely impact communications. For example, downstream data may be sent from a server on the Internet to a user device connected to a user terminal. The downstream data is sent to a ground station, transmitted to a satellite, sent from the satellite to the user terminal, and then sent to the user device. The latency of a single "hop" from ground station to user terminal will have at a minimum the propagation delay of 2 ms up, 2 ms down, for a total of 4 ms. If the downstream data elicits a response, the response travels the path in reverse, introducing at least another 4 ms of delay. However, other latencies may be introduced due to resource sharing, retransmission, and so forth. As a result, the user terminal may have to wait or coordinate for an opportunity to send the upstream data comprising the response back to the ground station. Additionally, in some situations the server may await the response before sending additional data. For example, the transmission control protocol (TCP) will send a packet and expects to receive an acknowledgement (ACK) indicating that the packet was successfully received. Without the ACK, the server may re-send the packet. As a result, the additional latencies associated with satellite operation may interact adversely with these expected patterns of sending data and receiving a response.

Described in this disclosure are techniques for substantially improving latency and throughput of a communication system that utilizes satellites by providing prospective grants of uplink resources to user terminals, responsive to analysis of downstream data. Downstream data that is addressed to a user terminal is processed to determine if a response is expected. This processing may include packet header inspection, deep packet inspection, traffic pattern analysis, and so forth. In one implementation, the downstream traffic is processed to determine if a particular protocol is in use. For example, a packet may be inspected to determine if the packet includes a TCP header indicative of a data transfer. If so, response header data may be generated and associated with the packet that indicates that a response packet such as an ACK is expected. In another implementation, traffic pattern analysis is performed that determines a response is likely to occur. For example, traffic pattern analysis may indicate that data originating from a particular network address to one or more UTs 108 has a high probability of being associated with data being sent from one or more UTs 108 to that network address.

The satellite receives the response header data and the associated downstream data. A resource scheduler onboard the satellite uses the response header data to determine if the downstream data is expected to produce a response. If so, the resource scheduler generates prospective grant data that prospectively allocates uplink resources for the user terminal to send the expected response. The prospective grant data provides a reservation on an uplink to the satellite that may then be used to send upstream data produced in response to the downstream data. For example, the prospective grant data may specify a particular timeslot to be used to send the upstream data.

In some implementations, the user terminal may send other data instead of or in addition to the upstream data. For example, if the upstream data is not ready for transmission at the time allocated by the prospective grant data, other information may be sent. For example, if the response was delayed or not provided, other information such as a buffer status report (BSR) indicative of data queued for transmission from the user terminal to the satellite, a scheduling request (SR) requesting allocation of uplink resources to send data to the satellite, previously enqueued data, and so forth may be sent.

By providing the prospective grant data in advance, the user terminal is able to quickly send the upstream data without negotiating for or otherwise waiting for uplink resources. For example, the prospective grant data provides a specified time during which the upstream data may be sent, rather than waiting for a commonly accessed timeslot in which many user terminals are in contention to use the uplink to send data to the satellite. The prospective grant data significantly reduces the latency associated with allocating uplink resources to allow the user terminal to send data to the satellite. This substantially improves overall performance of the communication system. For example, re-transmissions of data due to delayed ACKs being returned to a sending device are reduced or eliminated because the ACK is more quickly returned.

The prospective grant data also reduces or eliminates the need for the user terminal to request or otherwise negotiate uplink resources. This increases overall efficiency of the system by reducing the amount of management data sent and received, freeing up more resources for transfer of user data.

By using the system and techniques described in this disclosure, one or more satellites are able to provide very low latency handovers of communications between satellites and user terminals. This allows the user terminal to provide low latency communication service to an end user.

Illustrative System

The ability to communicate between two or more locations that are physically separated provides substantial benefits. Communications over areas ranging from counties, states, continents, oceans, and the entire planet are used to enable a variety of activities including health and safety, logistics, remote sensing, interpersonal communication, and so forth.

Communications facilitated by electronics use electromagnetic signals, such as radio waves or light to send information over a distance. These electromagnetic signals have a maximum speed in a vacuum of 299,792,458 meters per second, known as the "speed of light" and abbreviated "c". Electromagnetic signals may travel, or propagate, best when there is an unobstructed path between the antenna of the transmitter and the antenna of the receiver. This path may be referred to as a "line of sight". While electromagnetic signals may bend or bounce, the ideal situation for communication is often a line of sight that is unobstructed. Electromagnetic signals will also experience some spreading or dispersion. Just as ripples in a pond will spread out, a radio signal or a spot of light from a laser will spread out at progressively larger distances.

As height above ground increases, the area on the ground that is visible from that elevated point increases. For example, the higher you go in a building or on a mountain, the farther you can see. The same is true for the electromagnetic signals used to provide communication services. A relay station having a radio receiver and transmitter with their antennas placed high above the ground is able to "see" more ground and provide communication service to a larger area.

There are limits to how tall a structure can be built and where. For example, it is not cost effective to build a 2000 meter tall tower in a remote area to provide communication service to a small number of users. However, if that relay station is placed on a satellite high in space, that satellite is able to "see" a large area, potentially providing communication services to many users across a large geographic area. In this situation, the cost of building and operating the satellite is distributed across many different users and becomes cost effective.

A satellite may be maintained in space for months or years by placing it into orbit around the Earth. The movement of the satellite in orbit is directly related to the height above ground. For example, the greater the altitude the longer the period or time it takes for a satellite to complete a single orbit. A satellite in a geosynchronous orbit at an altitude of 35,800 km may appear to be fixed with respect to the ground because the period of the geosynchronous orbit matches the rotation of the Earth. In comparison, a satellite in a non-geosynchronous orbit (NGO) will appear to move with respect to the Earth. For example, a satellite in a circular orbit at 600 km will circle the Earth about every 96 minutes.

To an observer on the ground, the satellite in the 600 km orbit will speed by, moving from horizon to horizon in a matter of minutes.

Building, launching, and operating a satellite is costly. Traditionally, geosynchronous satellites have been used for broadcast and communication services because they appear stationary to users on or near the Earth and they can cover very large areas. This simplifies the equipment needed by a station on or near the ground to track the satellite.

However, there are limits as to how many geosynchronous satellites may be provided. For example, the number of "slots" or orbital positions that can be occupied by geosynchronous satellites are limited due to technical requirements, regulations, treaties, and so forth. It is also costly in terms of fuel to place a satellite in such a high orbit, increasing the cost of launching the satellite.

The high altitude of the geosynchronous satellite can introduce another problem when it comes to sharing electromagnetic spectrum. The geosynchronous satellite can "see" so much of the Earth that special antennas may be needed to focus radio signals to particular areas, such as a particular portion of a continent or ocean, to avoid interfering with radio services on the ground in other areas that are using the same radio frequencies.

Using a geosynchronous satellite to provide communication services also introduces a significant latency or delay because of the time it takes for a signal to travel up to the satellite in geosynchronous orbit and back down to a device on or near the ground. The latency due to signal propagation time of a single hop can be at least 240 milliseconds (ms).

To alleviate these and other issues, satellites in NGOs may be used. The altitude of an NGO is high enough to provide coverage to a large portion of the ground, while remaining low enough to minimize latency due to signal propagation time. For example, the satellite at 600 km only introduces 4 ms of latency for a single hop. The lower altitude also reduces the distance the electromagnetic signal has to travel. Compared to the geosynchronous orbit, the reduced distance of the NGO reduces the dispersion of electromagnetic signals. This allows the satellite in NGO as well as the device communicating with the satellite to use a less powerful transmitter, use smaller antennas, and so forth.

The system 100 shown here comprises a plurality (or "constellation") of satellites 102(1), 102(2), . . . , 102(S), each satellite 102 being in orbit 104. Also shown is a ground station 106, user terminal (UTs) 108, and a user device 110.

The constellation may comprise hundreds or thousands of satellites 102, in various orbits 104. For example, one or more of these satellites 102 may be in non-geosynchronous orbits (NGOs) in which they are in constant motion with respect to the Earth, such as low earth orbit (LEO). In this illustration, orbit 104 is depicted with an arc pointed to the right. A first satellite (SAT1) 102(1) is leading (ahead of) a second satellite (SAT2) 102(2) in the orbit 104. The satellite 102 is discussed in more detail with regard to FIG. 2.

One or more ground stations 106 are in communication with one or more satellites 102. The ground stations 106 may pass data between the satellites 102, a management system 150, networks such as the Internet, and so forth. The ground stations 106 may be emplaced on land, on vehicles, at sea, and so forth. Each ground station 106 may comprise a communication system 140. Each ground station 106 may use the communication system 140 to establish communication with one or more satellites 102, other ground stations 106, and so forth. The ground station 106 may also be connected to one or more communication networks. For example, the ground station 106 may connect to a terrestrial fiber optic communication network. The ground station 106 may act as a network gateway, passing user data or other data between the one or more communication networks and the satellites 102. Such data may be processed by the ground station 106 and communicated via the communication system 140. The communication system 140 of a ground station may include components similar to those of the communication system of a satellite 102 and may perform similar communication functionalities. For example, the communication system 140 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 106 are in communication with a management system 150. The management system 150 is also in communication, via the ground stations 106, with the satellites 102 and the UTs 108. The management system 150 coordinates operation of the satellites 102, ground stations 106, UTs 108, and other resources of the system 100. The management system 150 may comprise one or more of an orbital mechanics system 152 or a scheduling system 156.

The orbital mechanics system 152 determines orbital data 154 that is indicative of a state of a particular satellite 102 at a specified time. In one implementation, the orbital mechanics system 152 may use orbital elements that represent characteristics of the orbit 104 of the satellites 102 in the constellation to determine the orbital data 154 that predicts location, velocity, and so forth of particular satellites 102 at particular times or time intervals. For example, the orbital mechanics system 152 may use data obtained from actual observations from tracking stations, data from the satellites 102, scheduled maneuvers, and so forth to determine the orbital elements. The orbital mechanics system 152 may also consider other data, such as space weather, collision mitigation, orbital elements of known debris, and so forth.

The scheduling system 156 schedules resources to provide communication to the UTs 108. For example, the scheduling system 156 may determine handover data that indicates when communication is to be transferred from the first satellite 102(1) to the second satellite 102(2). Continuing the example, the scheduling system 156 may also specify communication parameters such as frequency, timeslot, subcarrier, modulation coding, and so forth. During operation, the scheduling system 156 may use information such as the orbital data 154, system status data 158, user terminal data 160, and so forth.

The system status data 158 may comprise information such as which UTs 108 are currently transferring data, satellite availability, current satellites 102 in use by respective UTs 108, capacity available at particular ground stations 106, and so forth. For example, the satellite availability may comprise information indicative of satellites 102 that are available to provide communication service or those satellites 102 that are unavailable for communication service. Continuing the example, a satellite 102 may be unavailable due to malfunction, previous tasking, maneuvering, and so forth. The system status data 158 may be indicative of past status, predictions of future status, and so forth. For example, the system status data 158 may include information such as projected data traffic for a specified interval of time based on previous transfers of user data. In another example, the system status data 158 may be indicative of future status, such as a satellite 102 being unavailable to provide communication service due to scheduled maneuvering, scheduled maintenance, scheduled decommissioning, and so forth.

The user terminal data 160 may comprise information such as a location of a particular UT 108. The user terminal data 160 may also include other information such as a priority assigned to user data associated with that UT 108, information about the communication capabilities of that particular UT 108, and so forth. For example, a particular UT 108 in use by a business may be assigned a higher priority relative to a UT 108 operated in a residential setting. Over time, different versions of UTs 108 may be deployed, having different communication capabilities such as being able to operate at particular frequencies, supporting different signal encoding schemes, having different antenna configurations, and so forth.

The UT 108 includes a communication system 180 to establish communication with one or more satellites 102. The communication system 180 of the UT 108 may include components similar to those of the communication system 212 of a satellite 102 and may perform similar communication functionalities. For example, the communication system 180 may include one or more modems, digital signal processors, power amplifiers, antennas (including at least one antenna that implements multiple antenna elements, such as a phased array antenna), processors, memories, storage devices, communications peripherals, interface buses, and so forth. The UT 108 passes user data between the constellation of satellites 102 and the user device 110. The user data includes data originated by the user device 110 (upstream data 112) or addressed to the user device 110 (downstream data 142). The UT 108 may be fixed or in motion. For example, the UT 108 may be used at a residence, or on a vehicle such as a car, boat, aerostat, drone, airplane, and so forth.

The UT 108 includes a tracking system 182. The tracking system 182 uses almanac data 184 to determine tracking data 186. The almanac data 184 provides information indicative of orbital elements of the orbit 104 of one or more satellites 102. For example, the almanac data 184 may comprise orbital elements such as "two-line element" data for the satellites 102 in the constellation that are broadcast or otherwise sent to the UTs 108 using the communication system 180.

The tracking system 182 may use the current location of the UT 108 and the almanac data 184 to determine the tracking data 186 for the satellite 102. For example, based on the current location of the UT 108 and the predicted position and movement of the satellites 102, the tracking system 182 is able to calculate the tracking data 186. The tracking data 186 may include information indicative of azimuth, elevation, distance to the second satellite, time of flight correction, or other information at a specified time. The determination of the tracking data 186 may be ongoing. For example, the first UT 108 may determine tracking data 186 every 100 ms, every second, every five seconds, or at other intervals.

With regard to FIG. 1, an uplink is a communication link which allows data to be sent to a satellite 102 from a ground station 106, UT 108, or device other than another satellite 102. Uplinks are designated as UL1, UL2, UL3 and so forth. For example, UL1 is a first uplink from the ground station 106 to the second satellite 102(2). In comparison, a downlink is a communication link which allows data to be sent from the satellite 102 to a ground station 106, UT 108, or device other than another satellite 102. For example, DL1 is a first downlink from the second satellite 102(2) to the ground station 106. The satellites 102 may also be in communication with one another. For example, an intersatellite link 190 provides for communication between satellites 102 in the constellation.

A traffic analysis system 146 processes data that is associated with one or more of the UTs 108. In one implementation, the traffic analysis system 146 may receive downstream data 142 addressed to a particular UT 108 from a device such as a server 144 that is accessed via an external network, such as the Internet. In another implementation, the downstream data 142 may be received from one or more devices within the system 100. For example, the management system 150 may generate downstream data 142 comprising a control message that is addressed to the particular UT 108. The traffic analysis system 146 may determine response header data 168. The response header data 168 may comprise information indicative of whether a response to the downstream data 142 is expected. The traffic analysis system 146 may use one or more techniques such as packet header inspection, deep packet inspection, traffic pattern analysis, processing with a machine learning system, and so forth.

Packet header inspection may comprise assessing the values of the packet headers to determine if a response is expected. This determination may be specific to a type of protocol associated with the downstream data 142. For example, if a packet header indicates that the packet is a transmission control protocol (TCP) packet sending payload and a sequence number. The receiving device is expected to receive the TCP packet and respond with an acknowledgement (ACK) packet and a sequence number. In comparison a user datagram protocol (UDP) packet may not be expected to produce a response as UDP does not utilize an acknowledgement process.

Deep packet inspection may be performed to analyze the downstream data 142 and determine if the downstream data 142 is expected to produce a response. Deep packet inspection may comprise assessing at least a portion of the data in the payload of packets comprising the downstream data 142. This assessment may involve comparing data present in the downstream data 142 with previously determined values. For example, the payload may begin with a characteristic set of bits that are associated with a subsequent response.

The traffic analysis system 146 may maintain data for some period of time to determine if downstream data 142 is likely to be associated with a response. For example, the traffic analysis system 146 may store at least a portion of downstream data 142 and upstream data 112 for several seconds. The traffic analysis system 146 may use information such as source address, destination address, port number, sequence numbers, timestamps, minimum response time, and so forth to determine if downstream data 142 is associated with upstream data 112. For example, at time=1203 milliseconds (relative to some reference epoch) downstream data 142 comprising a first packet with a source address of server 144(1) and a destination address of UT 108(1) is processed by the traffic analysis system 146. This first packet is sent to the UT 108(1). At time=1207 a second packet is received by the traffic analysis system 146 with a source address of UT 108(1) and a destination address of server 144(1). At time=1208 a third packet is also received by the traffic analysis system 146 with a source address of UT 108(1) and a destination address of server 144(1). Due to the propagation delays associated with signals to and from the satellite 102, the minimum response time possible for two hops may be determined to be 8 ms. In this example, the traffic analysis system 146 determines that the second packet is not responsive to the first packet because there was not enough time for the second packet to be received and the UT 108(1) to respond. However, the third packet was received after the minimum response time and so may be deemed responsive to the first packet.

In some implementations the traffic analysis system 146 may determine a time interval indicative of an expected response delay for a response to be sent. For example, the traffic analysis system 146 may compare a downlink timestamp indicative of a first time the downstream data 142 was transmitted to the UT 108 with an uplink timestamp indicative of a second time the upstream data 112 was transmitted from the UT 108 to the satellite 102. The expected response delay may be calculated as the difference between the first time and the second time. The expected response delay may be a minimum, maximum, average, moving average, and so forth of the differences from multiple packets. The expected response delay may be included in the response header data 168.

The traffic analysis system 146 may use previous data sent to or from the UT 108 to determine the response header data 168. For example, downstream data 142 previously sent to the UT 108 may be compared to upstream data 112 to determine if a response is expected.

In one implementation, the traffic analysis system 146 may operate on individual packets, frames, or other units of data transfer. For example, all packets may be analyzed. In another example, a portion of packets may be analyzed. In another implementation, the traffic analysis system 146 may operate on groups of packets, frames, or other units of data transfer. For example, the traffic analysis system 146 may aggregate groups of packets having a common destination address for a UT 108. A portion of the packets in the group of packets may be analyzed, and if a threshold count of packets is determined to be associated with responsive upstream data 112, a prospective grant may be provided.

In one implementation the response header data 168 may be appended to the downstream data 142. In another implementation the response header data 168 may be incorporated into the downstream data 142. For example, information indicative of a response being likely may be conveyed as data within a fixed header, extension header, and so forth of a packet to the UT 108.

The satellite 102 may include a resource scheduler 172. The resource scheduler 172 may use the response header data 168 to determine prospective grant data 166 that allocates uplink resources to a UT 108. The uplink from the UT 108 to a satellite 102 may be subject to various limiting factors. For example, a single satellite 102 may provide communication services to many UTs 108. Various techniques may be used to coordinate uplink communication from the UTs 108 to the satellite 102. For example, each UT 108 may be assigned a timeslot out of a regular recurring cycle, during which the UT 108 may transmit data. In another example, the resource scheduler 172 may allocate a UT 108 some uplink resources, such as a timeslot, responsive to receiving a scheduling request. In yet another example, each UT 108 may transmit when ready, with the result that many UTs 108 may be simultaneously transmitting to the satellite 102 and overlapping with one another. If no acknowledgement from the satellite 102 is received by the UT 108, the UT 108 may retransmit at some time. These various techniques introduce various delays. For example, waiting for a previously specified timeslot involves a delay for that timeslot to come around. The process of sending a scheduling request, waiting for a response, and receiving a grant for uplink resources also takes time and consumes communication resources. The process of transmitting when ready in a system with a large number of UTs 108 serviced by a single satellite 102 may result in poor throughput due to contention for the uplink resources, retransmission, and so forth.

The resource scheduler 172 assesses the response header data 168 of the downstream data 142 that is queued for transmission to the UT 108. If the response header data 168 indicates that a response is expected, the resource schedule 172 will allocate uplink resources for the expected upstream data 112. The prospective grant data 166 comprises the information indicative of this allocation and is sent to the UT 108. For example, the prospective grant data 166 may be indicative of one or more of a timeslot start, timeslot duration, or communication parameters such as subbeam data, frequency data, subcarrier data, modulation coding, and so forth.

In some implementations, the resource scheduler 172 may take into consideration the expected response delay while allocating the uplink resources. For example, the uplink resources may indicate a timeslot that begins on or after a time that is determined based on a sum of a time value indicative of when the downstream data 142 is to be sent and the expected response delay. By considering the interval of time of the expected response delay, the resource scheduler 172 avoids allocating uplink resources for a time before the responsive upstream data 112 is ready for transmission by the UT 108. For example, if the expected response delay is 50 ms, the resource scheduler 172 would not allocate uplink resources that are available until a time after transmission is complete plus the expected response delay. Continuing the example, if the transmission is expected to complete at time 3315 ms, and the expected response delay is 50 ms, the uplink resources would be allocated for a timeslot that begins on or after 3365 ms.

In one implementation the prospective grant data 166 may be sent with the downstream data 142 to the UT 108. In another implementation, the prospective grant data 166 may be sent separately to the UT 108. For example, the prospective grant data 166 may be transmitted to the UT 108 using a management channel while a data channel is used to send the downstream data 142.

In some implementations, at least a portion of the traffic analysis system 146 or equivalent functionality may be implemented by the resource scheduler 172 of the satellite 102. For example, protocol-based traffic analysis may be performed onboard the satellite 102 to determine a packet in the downstream data 142 is a TCP data transfer and prospective grant data 166 may be determined for the responsive ACK in the upstream data 112.

The UT 108 may provide additional information to another device that is using the UT 108 for communication services. For example, a user device 110 may be executing an application module 188 that is sending a series of packets to the server 144 and receiving a series of packets from the server 144. In some implementations the UT 108 and the user device 110 may be combined into a single device. In some implementations the application module 188 may execute on the UT 108.

The UT 108 may determine response window data that is indicative of a time that the responsive upstream data 112 must be received by the UT 108 for prompt transmission to the satellite 102 to take place. For example, the UT 108 may determine a response window that indicates a start time and an end time during which upstream data 112 received from the application module 188 may be sent to the satellite 102 without substantial delay. In comparison, if the application module 188 is unable to provide the upstream data 112 that is responsive to the downstream data 142 within the response window, an additional delay may be incurred while the UT 108 requests a grant for uplink resources, waits for those uplink resources to be available, and so forth.

In the event that the upstream data 112 is not available, or additional capacity is available, the UT 108 may opportunistically use the prospective grant to send other data. For example, the UT 108 may send one or more of the upstream data 112 (if available), a scheduling request, a buffer status report, or other data enqueued for transmission.

The resource scheduler 172 may constrain use of prospective grants to avoid saturation of the uplink. For example, the resource scheduler 172 may limit a total amount of resources associated with prospective grants during a particular interval to some fraction of the total. Continuing the example, if the uplink resources allow for a total uplink capacity measured in bits of 50 megabits of data transfer per timeslot, a maximum of 10 megabits may be allocated to prospective grants that are distributed using the prospective grant data 166. In one implementation the uplink resources comprise a total uplink capacity measured in bits. A threshold value indicative of less than the total uplink capacity may be determined. For example, the threshold value may indicate a fractional value of the total uplink capacity. The uplink resources allocated to one or more UTs 108 at a specified time are less than the threshold value. For example, a sum of all bits of uplink resources allocated in prospective grants may be less than or equal to the threshold value.

In another example, if the uplink resources allow for a total uplink capacity of 100 milliseconds of uplink time, 15 milliseconds of the 100 may be allocated for use by prospective grants. In one implementation, a threshold may be determined that is indicative of a percentage or other portion of the time available for uplink that is allocated for prospective grants. For example, the threshold may indicate that 15% of an uplink timeslot is to be allocated to prospective grants. The prospective grants may be issued until the threshold is reached. This is discussed with regard to FIG. 4.

The system 100 may take into account the utilization of previously assigned prospective grants to determine future prospective grants. For example, in addition to the upstream data 112, the traffic analysis system 146 may receive data indicative as to whether the upstream data 112 utilized the prospective grant data 166 and corresponding uplink resources. A utilization value may be determined that indicates the percentage of prospective grants that were actually used for responsive upstream data 112.

The traffic analysis system 146 may include the utilization value in the response header data 168 data. In some implementations the resource scheduler 172 may prioritize the allocation of uplink resources based at least in part on the utilization value. For example, packets having a high utilization value may be assigned prospective grants. If uplink resources remain available, the resource scheduler 172 may then assign prospective grants in descending order of utilization value.

The satellite 102, the ground station 106, the user terminal 108, the user device 110, the management system 150, or other systems described herein may include clocks. These clocks may be synchronized to a common source. In some implementations the clock may be a global positioning system (GPS) disciplined clock or an atomic clock that provides a high accuracy and high precision time source. Output from the clock may be used to coordinate operation of the system 100.

The satellite 102, the ground station 106, the user terminal 108, the user device 110, the management system 150, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), digital signal processors (DSPs), and so forth. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Figure 2:
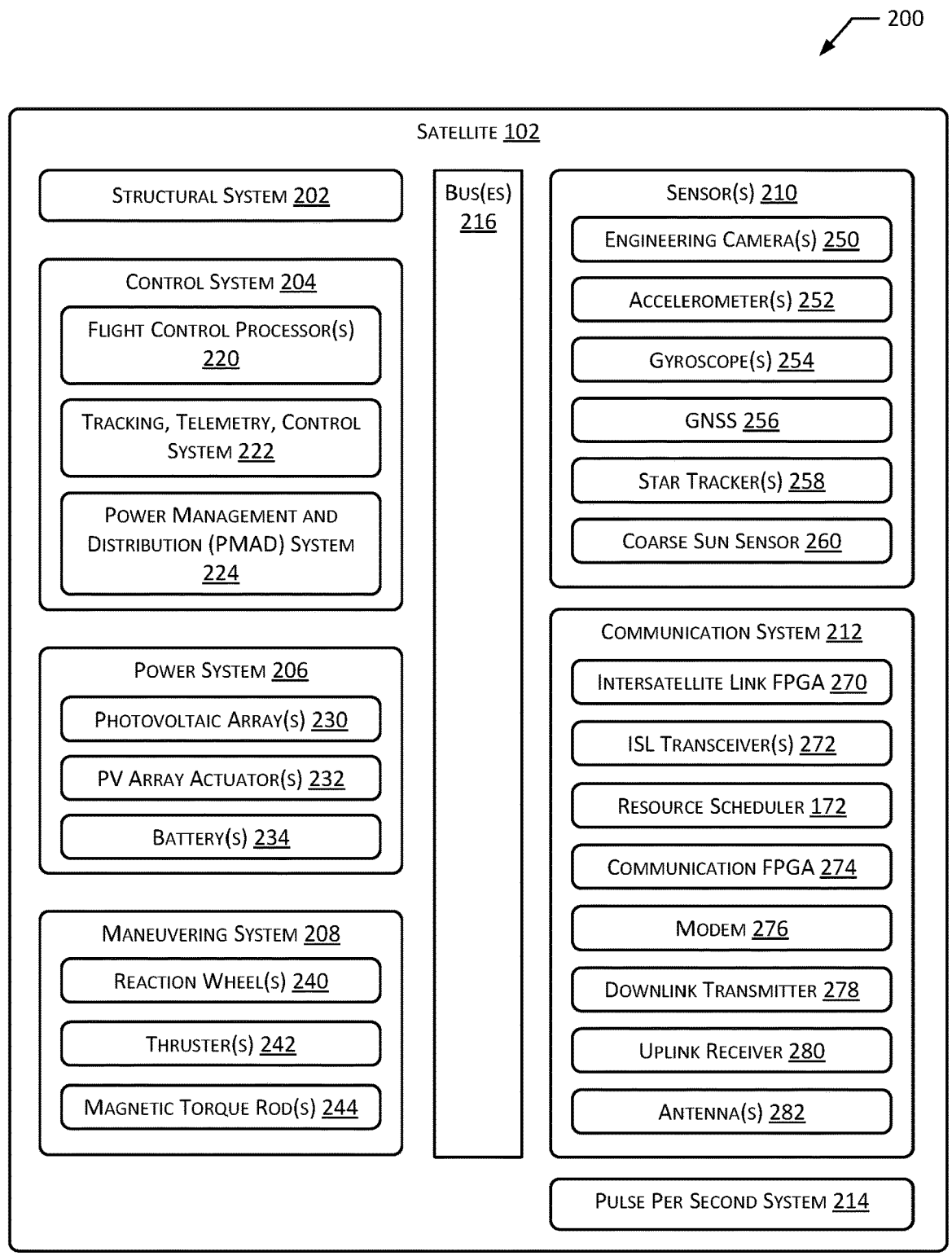
FIG. 2 is a block diagram of some systems associated with the satellite, according to some implementations.

FIG. 2 is a block diagram of some systems associated with the satellite 102, according to some implementations. The satellite 102 may comprise a structural system 202, a control system 204, a power system 206, a maneuvering system 208, one or more sensors 210, and a communication system 212. A pulse per second (PPS) system 214 may be used to provide timing reference to the systems onboard the satellite 102. One or more busses 216 may be used to transfer data between the systems onboard the satellite 102. In some implementations, redundant busses 216 may be provided. The busses 216 may include, but are not limited to, data busses such as Controller Area Network Flexible Data Rate (CAN FD), Ethernet, Serial Peripheral Interface (SPI), and so forth. In some implementations the busses 216 may carry other signals. For example, a radio frequency bus may comprise coaxial cable, waveguides, and so forth to transfer radio signals from one part of the satellite 102 to another. In other implementations, some systems may be omitted or other systems added. One or more of these systems may be communicatively coupled with one another in various combinations.

The structural system 202 comprises one or more structural elements to support operation of the satellite 102. For example, the structural system 202 may include trusses, struts, panels, and so forth. The components of other systems may be affixed to, or housed by, the structural system 202. For example, the structural system 202 may provide mechanical mounting and support for solar panels in the power system 206. The structural system 202 may also provide for thermal control to maintain components of the satellite 102 within operational temperature ranges. For example, the structural system 202 may include louvers, heat sinks, radiators, and so forth.

The control system 204 provides various services, such as operating the onboard systems, resource management, providing telemetry, processing commands, and so forth. For example, the control system 204 may direct operation of the communication system 212. The control system 204 may include one or more flight control processors 220. The flight control processors 220 may comprise one or more processors, FPGAs, and so forth. A tracking, telemetry, and control (TTC) system 222 may include one or more processors, radios, and so forth. For example, the TTC system 222 may comprise a dedicated radio transmitter and receiver to receive commands from a ground station 106, send telemetry to the ground station 106, and so forth. A power management and distribution (PMAD) system 224 may direct operation of the power system 206, control distribution of power to the systems of the satellite 102, control battery 234 charging, and so forth.

The power system 206 provides electrical power for operation of the components onboard the satellite 102. The power system 206 may include components to generate electrical energy. For example, the power system 206 may comprise one or more photovoltaic arrays 230 comprising a plurality of photovoltaic cells, thermoelectric devices, fuel cells, and so forth. One or more PV array actuators 232 may be used to change the orientation of the photovoltaic array(s) 230 relative to the satellite 102. For example, the PV array actuator 232 may comprise a motor. The power system 206 may include components to store electrical energy. For example, the power system 206 may comprise one or more batteries 234, fuel cells, and so forth.

The maneuvering system 208 maintains the satellite 102 in one or more of a specified orientation or orbit 104. For example, the maneuvering system 208 may stabilize the satellite 102 with respect to one or more axes. In another example, the maneuvering system 208 may move the satellite 102 to a specified orbit 104. The maneuvering system 208 may include one or more of reaction wheel(s) 240, thrusters 242, magnetic torque rods 244, solar sails, drag devices, and so forth. The thrusters 242 may include, but are not limited to, cold gas thrusters, hypergolic thrusters, solid-fuel thrusters, ion thrusters, arcjet thrusters, electrothermal thrusters, and so forth. During operation, the thrusters 242 may expend propellent. For example, an electrothermal thruster may use water as propellent, using electrical power obtained from the power system 206 to expel the water and produce thrust. During operation, the maneuvering system 208 may use data obtained from one or more of the sensors 210.

The satellite 102 includes one or more sensors 210. The sensors 210 may include one or more engineering cameras 250. For example, an engineering camera 250 may be mounted on the satellite 102 to provide images of at least a portion of the photovoltaic array 230. Accelerometers 252 provide information about acceleration of the satellite 102 along one or more axes. Gyroscopes 254 provide information about rotation of the satellite 102 with respect to one or more axes. The sensors 210 may include a global navigation satellite system (GNSS) 256 receiver, such as Global Positioning System (GPS) receiver, to provide information about the position of the satellite 102 relative to Earth. In some implementations the GNSS 256 may also provide information indicative of velocity, orientation, and so forth. One or more star trackers 258 may be used to determine an orientation of the satellite 102. A coarse sun sensor 260 may be used to detect the sun, provide information on the relative position of the sun with respect to the satellite 102, and so forth. The satellite 102 may include other sensors 210 as well. For example, the satellite 102 may include a horizon detector, radar, lidar, and so forth.

The communication system 212 provides communication with one or more other devices, such as other satellites 102, ground stations 106, user terminals 108, and so forth. The communication system 212 may include the resource scheduler 172, one or more modems 276, digital signal processors, power amplifiers, antennas (including at least one antenna that implements multiple antenna elements, such as a phased array antenna) 282, processors, memories, storage devices, communications peripherals, interface buses, and so forth. Such components support communications with other satellites 102, ground stations 106, user terminals 108, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 212 may be output to other systems, such as to the control system 204, for further processing. Output from a system, such as the control system 204, may be provided to the communication system 212 for transmission.

The communication system 212 may include hardware to support the intersatellite link 190. For example, an intersatellite link FPGA 270 may be used to modulate data that is sent and received by an ISL transceiver 272 to send data between satellites 102. The ISL transceiver 272 may operate using radio frequencies, optical frequencies, and so forth.

A communication FPGA 274 may be used to facilitate communication between the satellite 102 and the ground stations 106, UTs 108, and so forth. For example, the communication FPGA 274 may direct operation of a modem 276 to modulate signals sent using a downlink transmitter 278 and demodulate signals received using an uplink receiver 280. The satellite 102 may include one or more antennas 282. For example, one or more parabolic antennas may be used to provide communication between the satellite 102 and one or more ground stations 106. In another example, a phased array antenna may be used to provide communication between the satellite 102 and the UTs 108.

Figure 3:
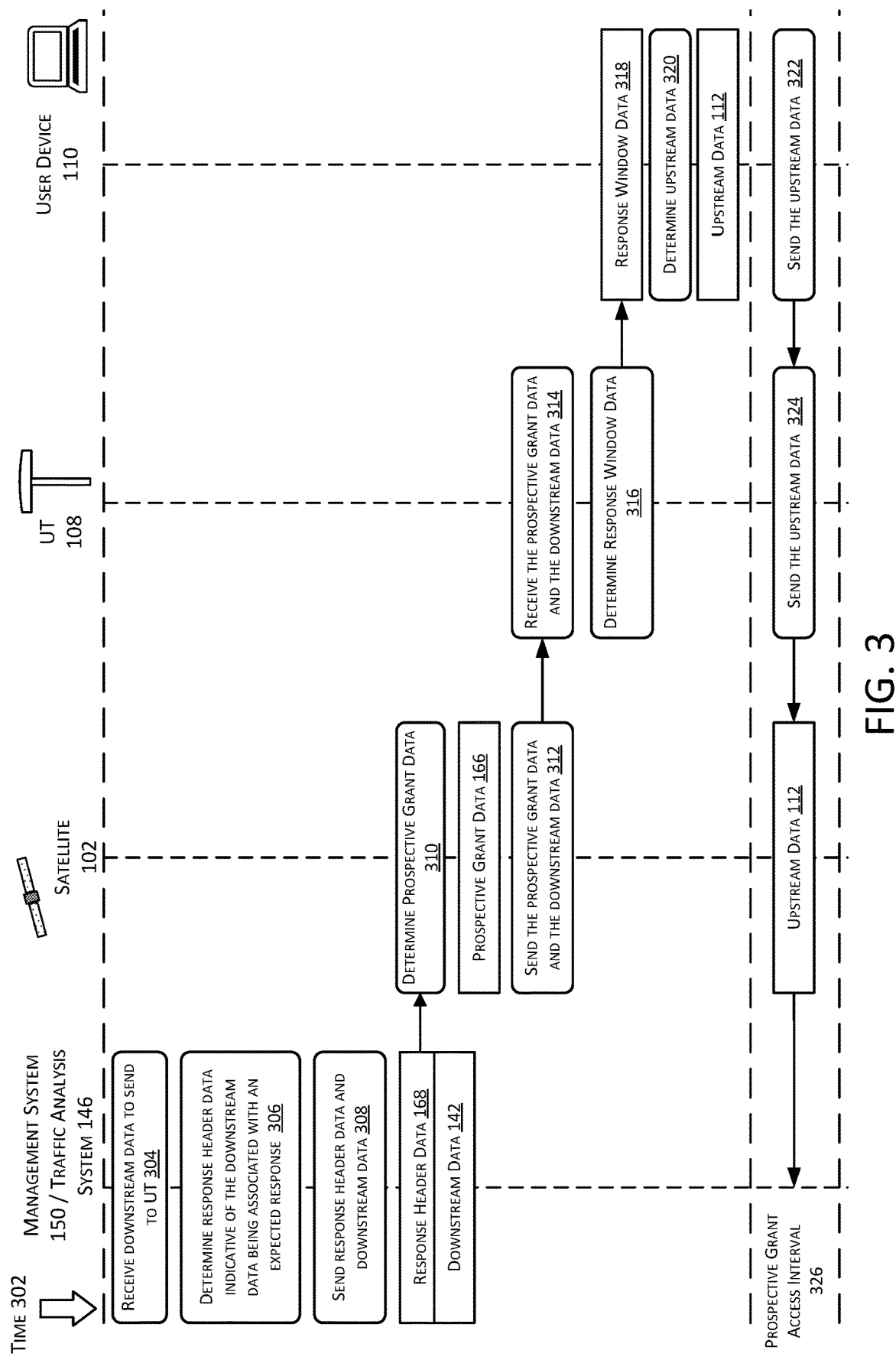
FIG. 3 illustrates a process of providing a prospective grant to a user terminal to facilitate communication, according to some implementations.

FIG. 3 illustrates a process of providing prospective grant data 166 to a user terminal 110 to facilitate communication, according to some implementations. In this illustration, time 302 generally increases from top to bottom of the page. For example, an operation depicted at the top of the page may occur before an operation depicted at the bottom of the page. In this illustration, the management system 150 and traffic analysis system 146, the satellite 102, the UT 108, and a user device 110 are shown. The ground station(s) 106 and other elements are omitted from this illustration for clarity, and not as a limitation.

While the system 100 is operating, the traffic analysis system 146 is processing at least a portion of the downstream data 142 to determine the response header data 168. At 304 the downstream data 142 that has a destination address associated with the UT 108 is received by the traffic analysis system 146. At 306 the traffic analysis system 146 determines the response header data 168 that is indicative of the downstream data 142 being associated with an expected response.

At 308 the response header data 168 and the downstream data 142 are sent to the satellite 102. For example, the ground station 106 may use a first uplink to send the response header data 168 and the downstream data 142 to the satellite 102.

At 310 the satellite 102 determines the prospective grant data 166. For example, the resource scheduler 172 executing onboard the satellite 102 processes the response header data 168 and determines that one or more packets in the downstream data 142 are designated as expected to have responsive upstream data 112 sent. The resource scheduler 172 allocates uplink resources that are determined to be available and generates prospective grant data 166 indicative of those uplink resources. For example, if the downstream data 142 comprises 271 packets for the UT 108 that are all designated as likely to have responses, the prospective grant data 166 may provide sufficient allocation of uplink resources for corresponding responsive upstream data 112 to be sent. Continuing the example, if the responsive packets are estimated at being 2 kilobits in length, the prospective grant data 166 may provide uplink resources for at least 271*2 or 542 kilobits, plus overhead.

The resource scheduler 172 may also consider the age of the downstream data 142 when determining the prospective grant data 166 and sending the downstream data 142 to the UT 108. For example, the downstream data 142 may be sorted in descending order by greatest time since sent to least. The oldest packets of downstream data 142 may be sent to the UT 108 first, and prospective grant data 166 may also provide for a similar priority of response, to allow the responsive upstream data 112 associated with those oldest packets to be prioritized during use of the prospective grant.

The resource scheduler 172 may also take into consideration the expected response delay. For example, the response header data 168 may indicate an expected response delay of 50 ms. Because the responsive upstream data 112 would not be available immediately, instead taking 50 ms, the prospective grant data 166 may be associated with a time that is at least 50 ms after the expected receipt of the downstream data 142 by the UT 108.

In some implementations the prospective grant data 166 may be determined by a device other than the satellite 102. For example, the scheduling system 156 may determine the prospective grant data 166.

At 312 the satellite 102 sends the prospective grant data 166 to the UT 108. In some implementations the prospective grant data 166 and the downstream data 142 may be sent as part of the same transmission, or via different channels. For example, the prospective grant data 166 may be transmitted using a management channel while the downstream data 142 is sent using a data channel.

At 314 the UT 108 receives the prospective grant data 166 and the downstream data 142.

At 316 the UT 108 may determine response window data 318 and send it to the user device 110. The response window data 318 comprises information indicative of a time interval or window within which the responsive upstream data 112 must be received by the UT 108 to allow for prompt transmission to the satellite 102 to take place using the prospective grant. For example, the UT 108 may determine a response window that indicates a start time and an end time.

The response window indicated by the response window data 318 may be determined based on one or more of the prospective grant data 166, data indicative of operation of the UT 108, and so forth. For example, the prospective grant data 166 may indicate a particular timeslot that corresponds to a particular interval of time relative to a clock for the system 100. Continuing the example, data indicative of the operation of the UT 108 may comprise an internal delay value that accounts for the time the UT 108 takes to process upstream data 112 and prepare that data for transmission. In one implementation a start time of the response window may be determined by subtracting the internal delay value from the timeslot start time. The end time of the response window data 318 may be determined by subtracting from the timeslot end time a sum of the internal delay value and an expected time value to account for transmission of the upstream data 112. In other implementations, other determinations may be used to determine the response window data 318. The user device 110, or an application module 188 executing thereon, may receive the response window data 318.

At 320 the upstream data 112 is determined. For example, the application module 188 receives the downstream data 142 and generates responsive upstream data 112. In some implementations, the determination of the upstream data 320 may be based at least in part on the response window data 318. For example, the application module 188 may use the responsive window data 318 to prioritize the determination of the upstream data 112, so the upstream data 112 is available in time to use the uplink resources allocated in the prospective grant data 166.

At 322 the upstream data 112 is sent from the user device 110 to the UT 108.

At 324 the UT 108 receives the upstream data 112 and sends the upstream data 112 using the uplink resources indicated in the prospective grant data 166. For example, the prospective grant data 166 may allocate a particular portion of a prospective grant access interval 326, during which UTs 108 issued prospective grants may transmit their data to the satellite 102.

The satellite 102 receives the upstream data 112 and transmits the upstream data 112 to the ground station 106. The ground station 106 may provide at least a portion of the upstream data 112 to the traffic analysis system 146. For example, header data associated with the upstream data 112 may be provided to the traffic analysis system 146 to facilitate the traffic analysis system 146 with determining the utilization value.

Because the UT 108 had received the prospective grant data 166 and had been allocated uplink resources, no additional delay is incurred by the system 100. For example, the UT 108 did not need to wait for a regularly scheduled timeslot, contend for access, send a request to the satellite 102 for uplink resources for the response, and so forth. As a result, the overall latency is substantially improved. Additional interchanges between the satellite 102 and the UT 108 to request allocation of uplink resources are eliminated or substantially reduced, improving efficiency and throughput of the system. Retransmissions due to delays in sending responsive ACKs are also substantially reduced, improving overall throughput by avoiding transmission of duplicative data.

Figure 4:
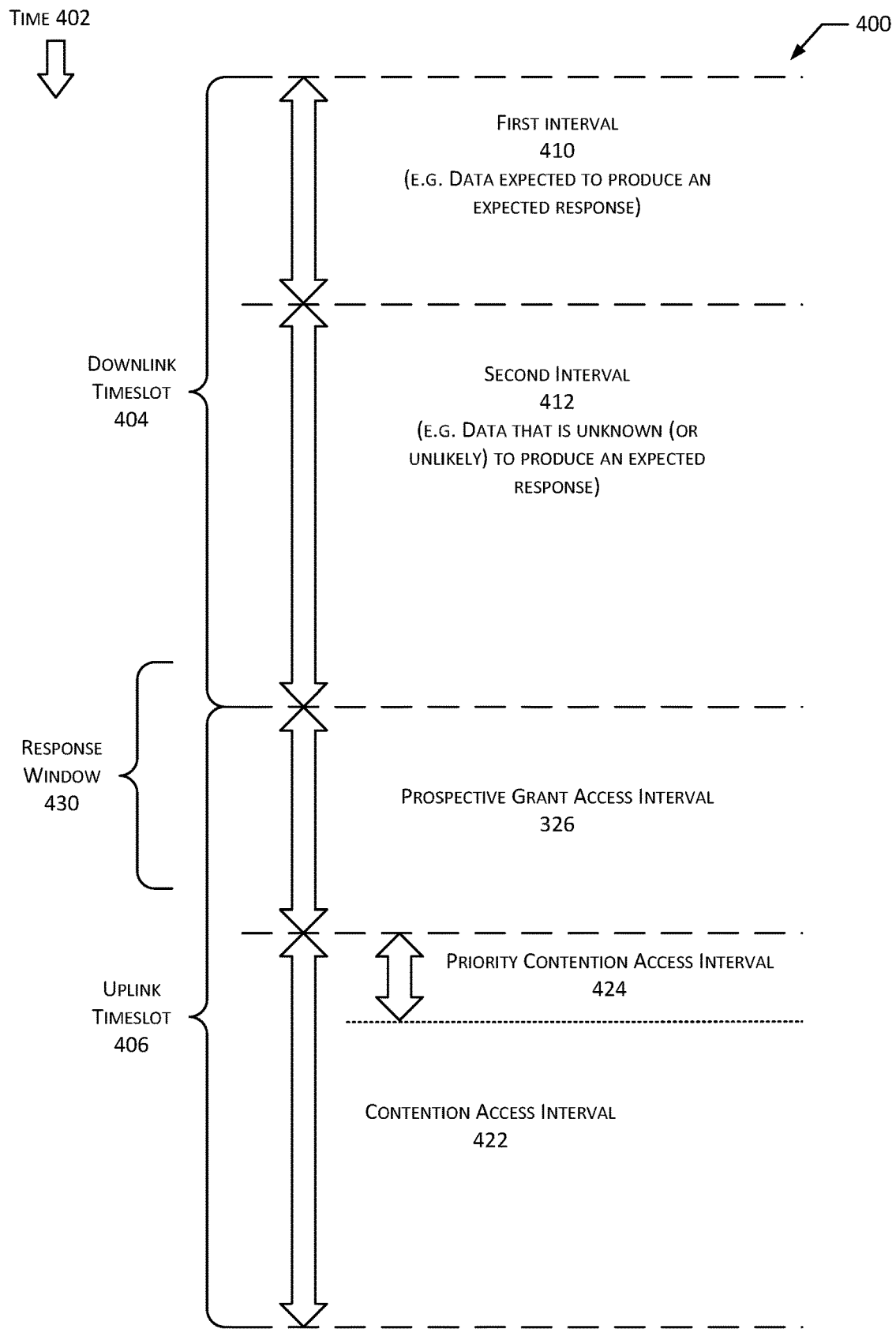
FIG. 4 illustrates a half-duplex example of timing for a downlink and an uplink that supports use of a prospective grant to facilitate communication, according to some implementations.

FIG. 4 illustrates at 400 a half-duplex example of timing for a downlink and an uplink that supports use of a prospective grant to facilitate communication, according to some implementations. In this illustration, time 402 generally increases from top to bottom of the page.

In this half-duplex illustration, a downlink timeslot 404 and an uplink timeslot 406 are depicted. The downlink timeslot 404 may be subdivided into a first interval 410 and a second interval 412. During the first interval 410, data that is expected to produce an expected response is sent from the satellite 102 to the UT 108. For example, the downstream data 142 that the response header data 168 indicates is likely to be associated with a response may be enqueued for transmission before data that is not. By sending the downstream data 142 expected to produce a response first, more time is available for the UT 108 or the user device 110 to determine the upstream data 112.

During the second interval 412 data that is unknown or unlikely to produce an expected response is sent from the satellite 102 to the UT 108.

The uplink timeslot 406 comprises a time interval that may be subdivided into multiple intervals. The prospective grant access interval 326 may be provided first. During the prospective grant access interval 326, the UT 108 that has been provided with prospective grant data 166 may use the uplink resources that have been allocated to communicate with the satellite 102 and send data such as the upstream data 112.

In some implementations the prospective grant access interval 326 may be provided at the end of the uplink timeslot 406. In another implementation the uplink timeslot 406 may include a plurality of prospective grant access intervals 326, such as one at the beginning, one at the end, and so forth.

The use of uplink resources for prospective grants may be limited to avoid saturation of the uplink or other adverse effects. In some implementations, a fraction of total uplink resources may be reserved for allocation and use by prospective grants. The uplink resources may be specified with respect to one or more of data transferred, time, and so forth. For example, the total uplink resources may be designated in terms of available data transfer, such as 50 megabits during an uplink session. Some portion of this data may be reserved for allocation to prospective grants and subsequent use. Continuing the example, 20% of the data permitted to be transferred during an uplink session, or 10 megabits, may be allocated for use by prospective grants.

In another example, the uplink resources may be designated in terms of a portion of available time for data transfer, such as a time interval of the uplink timeslot 406. In this example, a fraction of the total uplink timeslot 406 is allocated as the prospective grant access interval 326. For example, if the uplink resources allow for a total uplink capacity of 100 milliseconds of uplink time as indicated by the uplink timeslot 406, 15 milliseconds of the 100 may be allocated for use by prospective grants.

A threshold may specify the portion of total uplink resources that are available for use by the prospective grants. For example, the threshold may indicate a quantity of data, interval of time, and so forth. In the event the threshold has been reached, the determination of prospective grant data 166 may be temporarily suspended. For example, the resource scheduler 172, having allocated all of the available uplink time to prospective grants, may suspend resource scheduling until the next uplink timeslot 406. In some implementations the resource scheduler 172 may oversubscribe the uplink resources. For example, if the uplink resources associated with an uplink are limited to 10 megabits, the resource scheduler 172 may allocate prospective grants that total 11 megabits. The oversubscription may occur in situations where some of the allocated uplink resources associated with the prospective grants historically have been unused. For example, if 5% of uplink resources associated with prospective grants are historically not used, the resource scheduler 172 may oversubscribe to maintain maximum utilization of the uplink resources.

The uplink timeslot 406 may include a contention access interval 422. During the contention access interval 422, the UTs 108 serviced by the satellite 102 may contend with one another for access to the satellite 102. For example, a UT 108 may transmit a scheduling request for upstream data 112 during the contention access interval 422.

In some implementations, a portion of the contention access interval 422 may be designated as a priority contention access interval 424. In some implementations, the prospective grant data 166 may provide access to the priority contention access interval 424. During the priority contention access interval 424, a relatively small subset of the UTs 108 serviced by the satellite 102 are in contention with one another. For example, during the contention access interval 422 any one of thousands of UTs 108 may attempt to communicate with the satellite 102. Continuing the example, during the priority contention access interval 424, the prospective grant data 166 may have provided permission for a few hundred UTs 108 to contend for communication with the satellite 102.

A response window 430 is also depicted. As described above, the response window 430 may specify a time interval within which the responsive upstream data 112 must be received by the UT 108 to allow for transmission to the satellite 102 to take place using the prospective grant. In this illustration, the response window 430 begins before the uplink timeslot 406 and ends before the contention access interval 422. This offset in time may be used to accommodate latencies due to operation of the UT 108, such as the internal delay value. If the UT 108 receives the upstream data 112 during the response window 430, the UT 108 would be expected to be able to send the upstream data 112 during the prospective grant access interval 326.

In the event that the upstream data 112 is unavailable within the response window 430, the UT 108 will still send the upstream data 112. For example, the UT 108 may attempt to send the upstream data 112 during the contention access interval 422. If the upstream data 112 responsive to the downstream data 142 is unavailable within the response window 430, other data queued for transmission may be sent. For example, a buffer status report, scheduling request, previously undelivered upstream data 112 that is oldest, and so forth may be sent instead.

Figure 5:
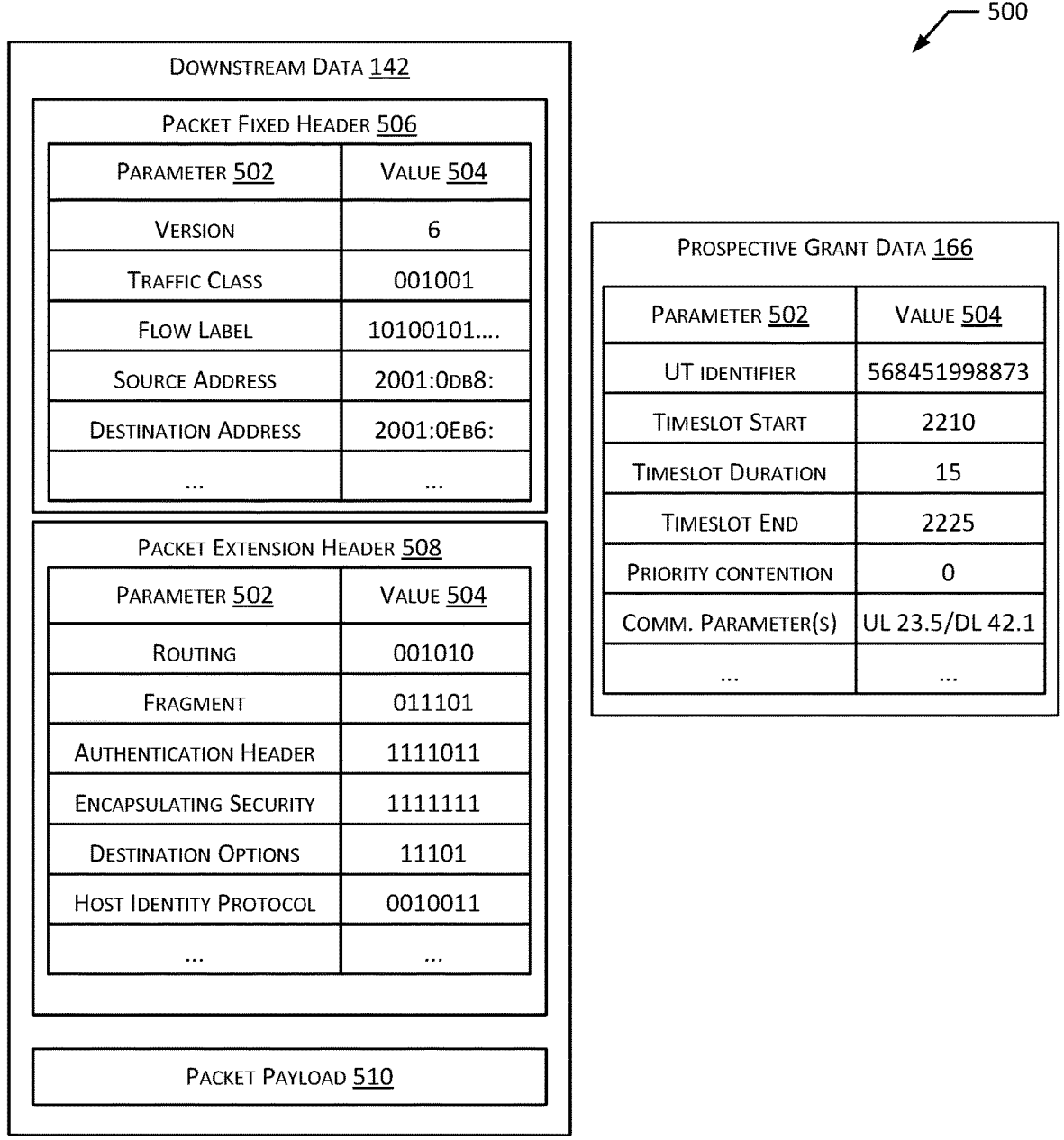
FIG. 5 illustrates data associated with operation of the system, according to some implementations.
Figure 5:
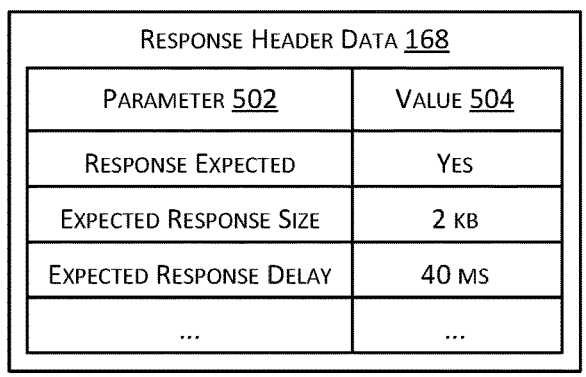

FIG. 5 illustrates data associated with operation of the system 100, according to some implementations. The data may include a parameter 502 and an associated value 504.

The downstream data 142 may comprise one or more headers. For example, packets compliant with Internet Protocol (IP) may include a packet fixed header 506, a packet extension header 508, a packet payload 510, and so forth. For example, the packet fixed header 506 may comprise version data, traffic class data, flow label data, source address, destination address, and so forth. In another example, the packet extension header 508 may comprise routing data, fragmentation data, authentication data, encapsulating security data, destination option data, host identity protocol data, and so forth.

One or more of the packet fixed header 506 or the packet extension header 508 may be implemented consistent with the Internet Protocol Version 6 (IPv6) specification promulgated by the Internet Engineering Task Force (IETF). (See Deering, S., "Internet Protocol, Version 6 (IPv6) Specification", RFC 8200, DOI 10.17487/RFC8200, July 2017, www.rfc-editor.org/info/rfc8200.) For example, the version data indicates the version of internet protocol in use. The traffic class data indicates the class of data for use in differentiated services and explicit congestion notification. The flow label may comprise data provided by a source of the downstream data 142 to label sequences of packets that are to be treated as a single flow. The source address is indicative of the source of the downstream data 142. The destination address is indicative of the destination address to which the downstream data 142 is to be delivered. The routing data is indicative of one or more intermediate network nodes that were used to transfer the packet. The fragment data is data that is used by a source of the downstream data 142 to indicate that data having a bit size larger than would otherwise fit within a single message transfer unit to the destination has been fragmented across several packets. The authentication header data and encapsulating security data are indicative of authentication and encapsulation associated with the downstream data 142. (See Kent, S., "IP Authentication Header", RFC 4302, DOI 10.17487/RFC4302, December 2005, www.rfc-editor.org/info/rfc4302.) The destination option data may comprise optional information to be examined by a destination node. The host identity protocol data may comprise data such as digital certificates to implement a host identity name space. (See Moskowitz, Ed., "Host Identity Protocol Version 2 (HIPv2)", RFC 7401, DOI 10.17487/RFC7401, April 2015, www.rfc-editor/info/rfc7401.)

The upstream data 112 may also comprise one or more headers as described with regard to the downstream data 142. During operation, the traffic analysis system 146 may analyze at least a portion of the downstream data 142. The traffic analysis system 146 may also analyze at least a portion of the upstream data 112. For example, the traffic analysis system 146 may compare source address, destination address, sequence numbers, and so forth to determine a particular packet in upstream data 112 is associated with a particular packet in downstream data 142.

The response header data 168 may comprise information indicative of whether a response to the downstream data 142 is expected. The parameters 502 may include response expected, expected response size, expected response delay, and so forth. For example, the response expected may have a single bit value that indicates 1 if a response is expected and 0 if no response is expected. The expected response size may be indicative of an estimated data size that is expected in the responsive upstream data 112. The expected response size may be used to determine the prospective grant data 166. For example, the expected response size and a count of expected responses may be used to determine the amount of data estimated to be sent from the UT 108 to the satellite 102. Based on the amount of data estimated, the prospective grant data 166 may be appropriately sized. The expected response delay is an estimate of the time from when the UT 108 processes or forwards the downstream data 142 and when the responsive upstream data 112 is received. For example, the traffic analysis system 146 may compare a downlink timestamp indicative of a first time the downstream data 142 was transmitted to the UT 108 with an uplink timestamp indicative of a second time the upstream data 112 was transmitted from the UT 108 to the satellite 102. The expected response delay may be calculated as the difference between the first time and the second time. The expected response delay may be a minimum, maximum, average, moving average, and so forth of the differences from multiple packets. The expected response delay may be included in the response header data 168.

In some implementations, the expected response delay may be determined by the UT 108 and then provided to the traffic analysis system 146. For example, the expected response delay may be determined by the UT 108 and then included in the upstream data 112. One or more of the resource scheduler 172 or the traffic analysis system 146 may extract the expected response delay for subsequent use with regard to similar packets. For example, the resource scheduler 172 may use the expected response delay to determine when uplink resources should be allocated. This minimizes the occurrence of a prospective grant being provided when the responsive upstream data 112 is not yet ready for transmission.

The prospective grant data 166 comprises information that is indicative of uplink resources that are allocated to at least the UT 108. The prospective grant data 166 may include one or more parameters 502 such as a UT identifier, timeslot start data, timeslot duration data, timeslot end data, priority contention data, communication parameters associated with the allocated uplink resources, and so forth. For example, the UT identifier may comprise a media access control value that indicates a particular UT 108. The timeslot start may indicate a time that the prospective grant access interval 326 begins, relative to a synchronization signal, clock time, or other time source. The timeslot duration may indicate how long the timeslot is available. In another implementation the prospective grant data 166 may include timeslot end data indicative of a time that the allocated timeslot concludes. In implementations where the priority contention access interval 424 is in use, priority content data may indicate permission to use the priority contention access interval 424. One or more communication parameters may specify modulation coding, uplink frequency data indicative of an uplink frequency to be used, downlink frequency data indicative of a downlink frequency to be used, subcarrier data indicative of a subcarrier to be used, and so forth.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
a first satellite;
a first user terminal (UT) that is in communication with the first satellite; and
a first system to:
receive first data having a destination address associated with the first UT;
determine, based at least in part on the first data, second data indicative of an expectation that a response to the first data will be sent by the first UT; and
send the first data and the second data to the first satellite; and
the first satellite to:
receive the first data and the second data at a first time;
determine, based on the second data, third data that is indicative of uplink resources allocated for the first UT to send data to the first satellite at a second time;
send the first data and the third data to the first UT;
receive, using the allocated uplink resources, fourth data from the first UT; and
send the fourth data to the first system.

2. The system of claim 1, wherein the third data is indicative of one or more of:
timeslot start data indicative of a third time at which the first UT is permitted to start sending data to the first satellite;
timeslot duration data indicative of a duration of a timeslot during which the first UT is permitted to send data to the first satellite;
timeslot end data indicative of a fourth time at which the first UT must cease sending data to the first satellite;
subcarrier data indicative of a subcarrier to be used to send data to the first satellite; or
one or more communication parameters comprising one or more of:
frequency, or
modulation coding.

3. The system of claim 1, wherein the fourth data comprises one or more of:
fifth data that is responsive to at least a portion of the first data,
sixth data indicative of data enqueued for transmission by the first UT,
a scheduling request for allocation of uplink resources to the first UT to send data, or
data previously enqueued at the first UT for transmission.

4. The system of claim 1, wherein the second data is determined based on one or more of:
a traffic class,
a flow label,
a source address,
a destination address;
routing data,
fragment data,
authentication header data,
encapsulating security data,
destination option data, or
host identity protocol.

5. The system of claim 1, the first UT further to:
receive the first data;
receive the third data;
determine, based on the third data, fifth data indicative of an interval from a third time to a fourth time during which the fourth data may be sent;
send the first data and the fifth data to a first device executing a first application;
receive the fourth data; and
send, based on the third data, the fourth data to the first satellite.

6. The system of claim 1, the first satellite further to:
send fifth data to the first UT at a third time;
receive sixth data from the first UT at a fourth time;
determine a first time interval based on a difference between the third time and the fourth time, wherein the first time interval is indicative of an expected response delay; and
wherein the third data is determined based on the first time interval such that the uplink resources are available at a time after the first time interval.

7. The system of claim 1, wherein the uplink resources comprise an uplink timeslot having a first time interval;
the first system further to:
determine a second time interval, wherein the second time interval is shorter than the first time interval and is within the first time interval; and
wherein the third data is indicative of a third time interval that is less than the second time interval and is within the second time interval.

8. The system of claim 1, the first satellite further to:
receive fifth data and sixth data at a third time;
determine, based on the sixth data, seventh data that is indicative of second uplink resources allocated for the first UT to send data to the first satellite at a fourth time;
send the fifth data and the seventh data to the first UT;
determine the second uplink resources associated with the seventh data were unused by the first UT;
receive, after the fourth time, eighth data having a destination address associated with the first UT; and
send the eighth data to the first UT without allocation of uplink resources.

9. A method comprising:
receiving first data addressed to a first user terminal (UT);
determining second data, based on the first data, that is indicative of whether a response to the first data is expected;
determining third data, based on the second data, indicative of uplink resources allocated to the first UT to facilitate communication with a satellite at a first time;
sending the first data and the third data to the first UT at a second time; and receiving at the satellite, using the uplink resources indicated by the third data, fourth data from the first UT at a third time.

10. The method of claim 9, wherein the third data is indicative of one or more of:
   timeslot start data indicative of a fourth time at which the first UT is permitted to start sending data to the satellite;
   timeslot duration data indicative of a duration of a timeslot during which the first UT is permitted to send data to the satellite;
   timeslot end data indicative of a fifth time at which the first UT must cease sending data to the satellite; or
   subcarrier data indicative of a subcarrier to send data to the satellite.

11. The method of claim 9, wherein the fourth data comprises one or more of:
   data responsive to at least a portion of the first data,
   fifth data indicative of data enqueued for transmission by the first UT,
   a scheduling request for allocation of uplink resources to the first UT to send data, or
   data previously enqueued at the first UT for transmission.

12. The method of claim 9, wherein the first data comprises a packet; and
   the second data is determined based on one or more of:
      at least a portion of a header of the packet,
      a payload of the packet,
      a timestamp associated with transmission of the first data, or
      previous data sent to or from the first UT.

13. The method of claim 9, further comprising:
   sending fifth data from the satellite to the first UT at a fourth time, wherein the fourth time is before the first time;
   receiving at the satellite, sixth data from the first UT at a fifth time, wherein the fifth time is before the first time;
   determining seventh data indicative of an interval of time between the fourth time and the fifth time; and
   wherein the third data is indicative of a timeslot that begins on or after a sixth time, further wherein the sixth time is based on a sum of the second time and the seventh data.

14. The method of claim 9, wherein the uplink resources comprise a total uplink capacity measured in bits; and further comprising:
   determining a threshold value indicative of less than the total uplink capacity; and
   wherein the uplink resources allocated to one or more UTs at a specified time are less than the threshold value.

15. The method of claim 9, further comprising:
   determining a first plurality of data indicative of uplink resources allocated to the first UT at a plurality of different times;
   determining, at a fourth time, a first count of the uplink resources indicated by the first plurality of data that have been used by the first UT to send data to the satellite;
   determining the first count is less than a threshold value; and
   suspending allocation of uplink resources after the fourth time.

16. The method of claim 9, wherein the first data comprises a plurality of packets, and further comprising:
   determining a first count of packets that have second data indicative of a response expected;
   determining a first total based on the first count and an estimated data size of a response to each of the first count of packets; and
   wherein the uplink resources indicated by the third data are determined based on the first total.

17. A system comprising:
   at least one memory storing computer-executable instructions; and
   at least one processor to execute the instructions to:
      receive first data associated with a first user terminal (UT);
      determine second data that is indicative of whether a response to at least a portion of the first data is expected;
      determine, based on the second data, third data that is indicative of uplink resources allocated to the first UT to facilitate communication with a satellite at a first time;
      send the first data and the third data to the first UT at a second time; and
      receive, using the uplink resources indicated by the third data, fourth data from the first UT at a third time.

18. The system of claim 17, wherein the fourth data comprises one or more of:
   fifth data that is responsive to at least a portion of the first data,
   sixth data indicative of data enqueued for transmission by the first UT,
   a scheduling request for allocation of uplink resources to the first UT to send data, or
   data previously enqueued at the first UT for transmission.

19. The system of claim 17, the at least one processor to further execute instructions to:
   send fifth data to the first UT at a fourth time;
   receive sixth data from the first UT at a fifth time;
   determine a first interval based on the fourth time and the fifth time; and
   wherein the third data is determined based on the first interval such that the uplink resources are available at a time greater than the first interval.

20. The system of claim 17, the at least one processor to further execute instructions to:
   determine a first threshold based on a capacity for a satellite to receive data from one or more user terminals; and
   wherein the uplink resources allocated by the third data is less than the first threshold.

* * * * *